United States Patent
Bothe et al.

(10) Patent No.: US 7,429,233 B2
(45) Date of Patent: Sep. 30, 2008

(54) METHOD FOR SHIFTING FROM A SOURCE GEAR TO A TARGET GEAR IN A TWIN CLUTCH TRANSMISSION

(75) Inventors: Edgar Bothe, Peine (DE); Henning Müller, Gifhorn (DE); Volker Gärtner, Wurmberg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/837,583

(22) Filed: Aug. 13, 2007

(65) Prior Publication Data

US 2008/0026909 A1 Jan. 31, 2008

Related U.S. Application Data

(63) Continuation of application No. PCT/EP2006/000030, filed on Jan. 4, 2006.

(30) Foreign Application Priority Data

Feb. 11, 2005 (DE) ........................ 10 2005 006 567

(51) Int. Cl.
*B60W 10/04* (2006.01)
(52) U.S. Cl. ..................................... 477/115
(58) Field of Classification Search ................ 477/115, 477/121; 74/329, 330, 331, 335, 340
See application file for complete search history.

(56) References Cited

U.S. PATENT DOCUMENTS

| | | | |
|---|---|---|---|
| 4,852,006 A | 7/1989 | Speranza | |
| 5,035,157 A | 7/1991 | Aoki et al. | |
| 5,950,781 A * | 9/1999 | Adamis et al. | 192/3.61 |
| 6,123,644 A | 9/2000 | Janecke et al. | |
| 6,286,381 B1 * | 9/2001 | Reed et al. | 74/336 R |
| 6,941,830 B2 * | 9/2005 | Ibamoto et al. | 74/339 |

FOREIGN PATENT DOCUMENTS

| | | |
|---|---|---|
| DE | 103 08 797 A1 | 6/2004 |
| WO | 2005/008103 A1 | 1/2005 |

* cited by examiner

*Primary Examiner*—Roger Pang

(57) ABSTRACT

Gear shifts are carried out from a source gear to a target gear of a twin clutch transmission. The twin clutch transmission has sequentially directly successive gears assigned to different transmission input shafts. In each case one upshift and downshift threshold, which is defined as a function of the throttle pedal position, for each possible sequential gear change is stored as a corresponding vehicle speed value in a control unit. In case of a commanded downshift from a source gear to a lower gear, the target gear is determined in that the current vehicle speed is initially compared with the limit value of the closest downshift threshold, or of the adjacent downshift thresholds in the downshift direction, until the current vehicle speed is higher than the respective limit value of the most recently checked downshift threshold, in that, if, at the most recently checked downshift threshold, the higher gear of the downshift threshold is assigned the same transmission input shaft as the source gear, then the current vehicle speed is compared with the limit value of the upshift threshold which corresponds to the most recently checked downshift threshold. When the current vehicle speed is higher than the limit value of the upshift threshold, the higher gear of the upshift threshold is selected as a target gear. If the vehicle speed is lower than the limit value of the upshift threshold, the lower gear of the upshift threshold is selected as a target gear.

5 Claims, 4 Drawing Sheets

METHOD FOR SHIFTING FROM A SOURCE GEAR TO A TARGET GEAR IN A TWIN CLUTCH TRANSMISSION

CROSS-REFERENCE TO RELATED APPLICATIONS

This is a continuing application, under 35 U.S.C. § 120, of copending international application No. PCT/EP2006/000030, filed Jan. 4, 2006, which designated the United States; this application also claims the priority, under 35 U.S.C. § 119, of German patent application No. DE 10 2005 006 567.8, filed Feb. 11, 2005; the prior applications are herewith incorporated by reference in their entirety.

BACKGROUND OF THE INVENTION

Field of the Invention

The invention relates to a method for carrying out gear shifts from a source gear to a target gear of a twin clutch transmission. The twin clutch transmission has a plurality of gears which are distributed between two transmission input shafts, with sequentially directly successive gears being assigned to different transmission input shafts, in particular with the first input shaft being assigned the first, third and/or fifth gear and the second transmission input shaft being assigned the second, fourth and/or sixth gear, with in each case one upshift and downshift threshold, specifically the limit value applicable for the respective upshift or downshift, which is defined as a function of the throttle pedal position, for each possible sequential gear change being stored as a corresponding vehicle speed value in a control unit, and with the vehicle speed which varies and the throttle pedal position which varies as the motor vehicle is traveling being measured.

Prior art twin clutch transmissions are constructed so as to have two transmission input shafts. Each transmission input shaft is assigned certain gears. In general, the first transmission input shaft is assigned the first, third and fifth gears and the second transmission input shaft is assigned the second, fourth and sixth gears. The corresponding different gears are thus situated on different partial transmissions of the twin clutch transmission. The shift strategy must correspondingly incorporate this. It is also necessary in particular for so-called "indirect shifts" to be carried out, since so-called "direct shifts" are possible only between gears of different partial transmissions. Shifts between gears which are on a certain partial transmission are possible only with the interposition of an intermediate gear. In general, upshift and downshift thresholds, or corresponding characteristic curves, which are defined as a function of the vehicle speed and the throttle pedal position in each case for possible sequential gear changes are stored in a control unit, with the vehicle speed which varies and the throttle pedal position which varies as the motor vehicle is traveling being measured in order to realize, by means of a corresponding comparison with the upshift threshold or the downshift threshold, a corresponding shift in the twin clutch transmission automatically.

FIG. 1 shows the driving strategy that is known from the prior art for selecting a gear for a downshift in a known twin clutch transmission. The twin clutch transmission which is to be shifted here has for example six gears which are referred to correspondingly as "Gear 1, Gear 2, . . . etc". If, in the twin clutch transmission, a source gear, in this case for example the sixth gear "Gear 6", is engaged, then the new target gear of the twin clutch transmission is selected as a function of the measured current vehicle speed. For this purpose, corresponding downshift thresholds are stored in the control unit as a function of the vehicle speed and the throttle pedal position, as is previously known in the prior art.

The terms gear 1, gear 2, etc. are used with reference to the ordinals thereof in the mechanical gear ratio behaviors. That is, the numerals of the gear designations relate to higher or lower gear ratios, respectively.

Here, it is possible in FIG. 1 to clearly see—illustrated schematically as a block diagram—the corresponding "downshift thresholds" for the shifts from the sixth into the fifth gear, that is to say from 6→5, from the fifth into the fourth gear 5→4, from the fourth into the third gear 4→3, from the third into the second gear 3→2, and from the second into the first gear 2→1. The individual specific vehicle speed values (limit values) for the respective downshift thresholds are stored in the control unit as a function of specific throttle pedal positions. In other words, for certain shifts or gear changes, corresponding downshift threshold values, referred to in the following as "limit values", are stored in the control unit as a function of a certain throttle pedal position and as a function of a certain vehicle speed. The values which exist for a specific shift for example from the fourth into the third gear 4→3, that is to say the corresponding limit values, then form a certain downshift characteristic curve along the throttle pedal deflection range from 0 to 100%. Between the individual downshift characteristic curves, there are thus intermediate regions in which the in each case presently measured vehicle speed falls.

As can be seen from FIG. 1, for an engaged sixth gear "Gear 6" as a source gear, for example, the corresponding target gear is determined as follows. The current vehicle speed is initially measured. The current vehicle speed is then compared with the limit value of the specific downshift threshold for the shift from the sixth into the fifth gear 6→5. If the current vehicle speed is higher than the stored limit value of said downshift threshold for the shift from the sixth into the fifth gear, then the branch "No" is taken and the sixth gear "Gear 6" is maintained. If, however, the current vehicle speed is lower than the limit value of the downshift threshold from 6→5, then the branch "Yes" is taken and the subsequent downshift threshold for the shift from the fifth into the fourth gear 5→4 is queried. Here, if the current vehicle speed is then higher than the limit value of the downshift threshold of the shift 5→4, then the branch "No" is taken and the fifth gear is selected as a target gear. If, however, the current vehicle speed is lower than the downshift threshold of the shift 5→4, then the branch "Yes" is taken and the values are checked on the basis of the subsequent downshift threshold of the shift 4→3 . . . and so on, specifically until the current vehicle speed is higher than a certain downshift threshold for the shift Y→X. Only then is the target gear X correspondingly selected. FIG. 1 clarifies the above-described, already generally known method.

On account of the shift strategies which are to be realized in a transmission controller, the corresponding upshift and downshift characteristic curves of all the gears are stored in the control unit of the twin clutch transmission as a function of the corresponding throttle pedal position, that is to say an upshift or downshift characteristic curve yields, for a certain throttle pedal position, a certain vehicle speed at which a certain upshift or downshift takes place. Said respective "limit values" are in each case compared with the current vehicle speed, with said respective limit value points on the corresponding upshift or downshift characteristic curve then being referred to in the following as an upshift threshold or downshift threshold.

In order to realize the driving strategies, in particular in a twin clutch transmission, in terms of comfort, the upshift and downshift characteristic curves can have different profiles. In the case of a twin clutch transmission in particular, it can therefore be the case in practice that, during shifts, in particular a "double downshift" in a twin clutch transmission, indirect shifts can be carried out, specifically for example from the sixth gear, which is on the second transmission input shaft, to the fourth gear, which is situated on the same transmission input shaft, via the fifth gear.

SUMMARY OF THE INVENTION

It is accordingly an object of the invention to provide a method for implementing gear shifts from a source gear to a target gear of a twin clutch transmission which overcomes the above-mentioned disadvantages of the heretofore-known devices and methods of this general type and which improves the process in such a way that the number of indirect shifts in a twin clutch transmission from a source gear to a target gear is reduced.

With the foregoing and other objects in view there is provided, in accordance with the invention, a method for shifting from a source gear to a target gear in a twin clutch transmission of a motor vehicle. The twin clutch transmission has a plurality of gears distributed between two transmission input shafts, with sequentially directly successive gears being assigned to different transmission input shafts, and wherein in each case one upshift and downshift threshold, with a limit value applicable for the respective upshift or downshift, defined as a function of a throttle pedal position, for each possible sequential gear change is stored in a control unit as a corresponding vehicle speed value. The method comprises the following steps:

measuring a variable vehicle speed and a variable throttle pedal position as the motor vehicle is traveling;

in case of a nominal downshift from a source gear to a lower gear, determining a target gear by initially comparing a current vehicle speed with the limit value of a respectively closest downshift threshold, or of adjacent downshift thresholds in the downshift direction, until the current vehicle speed is higher than the respective limit value of a most recently checked downshift threshold;

if, at a most recently checked downshift threshold, the higher gear of the downshift threshold is assigned the same transmission input shaft as the source gear, comparing the current vehicle speed with the limit value of an upshift threshold that corresponds with the most recently checked downshift threshold, and, when the current vehicle speed is higher than the limit value of the upshift threshold, selecting the higher gear of the upshift threshold as the target gear, but if the current vehicle speed is lower than the limit value of the upshift threshold, selecting the lower gear of the upshift threshold as the target gear.

In the preferred embodiment of the invention, the gears are assigned as follows: the first gear, the third gear, and/or the fifth gear to a first transmission input shaft, the second gear, the fourth gear, and/or the sixth gear to a second transmission input shaft.

In other words, the objects of the invention are achieved in that, in the case of a commanded downshift from a source gear to a lower gear, the target gear is determined in that the current vehicle speed is initially compared with the limit value of the closest downshift threshold, or of the adjacent downshift thresholds in said downshift direction, until the current vehicle speed is higher than the respective limit value of the most recently checked downshift threshold, in that, if, at the most recently checked downshift threshold, the higher gear of said downshift threshold is assigned the same transmission input shaft as the source gear, then the current vehicle speed is compared with the limit value of the upshift threshold which corresponds to the most recently checked downshift threshold, and in that, when the current vehicle speed is higher than said limit value of the upshift threshold, the higher gear of said upshift threshold is selected as a target gear, but if the current vehicle speed is lower than the limit value of the upshift threshold, the lower gear of said upshift threshold is selected as a target gear. The above also initially applies to a downshift.

With the above and other objects in view there is also provided, in accordance with the invention, a method for up-shifting from a lower source gear to a higher target gear in the twin clutch transmission. The upshift method comprises:

determining the target gear by initially comparing a current vehicle speed with a limit value of a closest upshift threshold, or of adjacent upshift thresholds in the upshift direction, until the current vehicle speed is lower than the respective limit value of a most recently checked upshift threshold;

if, at the most recently checked upshift threshold, a lower gear of the upshift threshold is assigned the same transmission input shaft as the source gear, comparing the current vehicle speed with the limit value of the downshift threshold that corresponds to the most recently checked upshift threshold; and when the current vehicle speed is lower than said the value of the downshift threshold, selecting the lower gear of the downshift threshold as a target gear, but if the current vehicle speed is higher than the limit value of the downshift threshold, selecting the higher gear of the downshift threshold as a target gear.

In other words, for an upshift, the above and other objects are achieved in that the target gear is determined in that the current vehicle speed is initially compared with the limit value of the closest upshift threshold, or of the adjacent upshift thresholds in said upshift direction, until the current vehicle speed is lower than the respective limit value of the most recently checked upshift threshold, in that, if, at the most recently checked upshift threshold, the lower gear of said upshift threshold is assigned the same transmission input shaft as the source gear, then the current vehicle speed is compared with the limit value of the downshift threshold which corresponds to the most recently checked upshift threshold, and in that, when the current vehicle speed is lower than said limit value of the downshift threshold, the lower gear of said downshift threshold is selected as a target gear, but if the current vehicle speed is higher than the limit value of the downshift threshold, the higher gear of said downshift threshold is selected as a target gear.

With the method according to the invention, it is possible in particular to reduce the so-called indirect shifts in a twin clutch transmission. The motor vehicle which is operated with the method according to the invention acts more spontaneously with said varied shift strategy, and the shift duration is lower overall. It is for example possible, in the case of an intended "downshift" from the sixth gear into the fourth gear, to avoid an indirect shift specifically if it is determined that the current vehicle speed is lower than the upshift threshold of the shift from the third into the fourth gear 3→4. Here, a shift can then be made directly into the third gear. The number of shifts is thereby considerably reduced, and the comfort and spontaneity are considerably improved and the disadvantages described in the introduction are avoided.

Other features which are considered as characteristic for the invention are set forth in the appended claims.

Although the invention is illustrated and described herein as embodied in method for carrying out gear shifts from a source gear to a target gear of a twin clutch transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
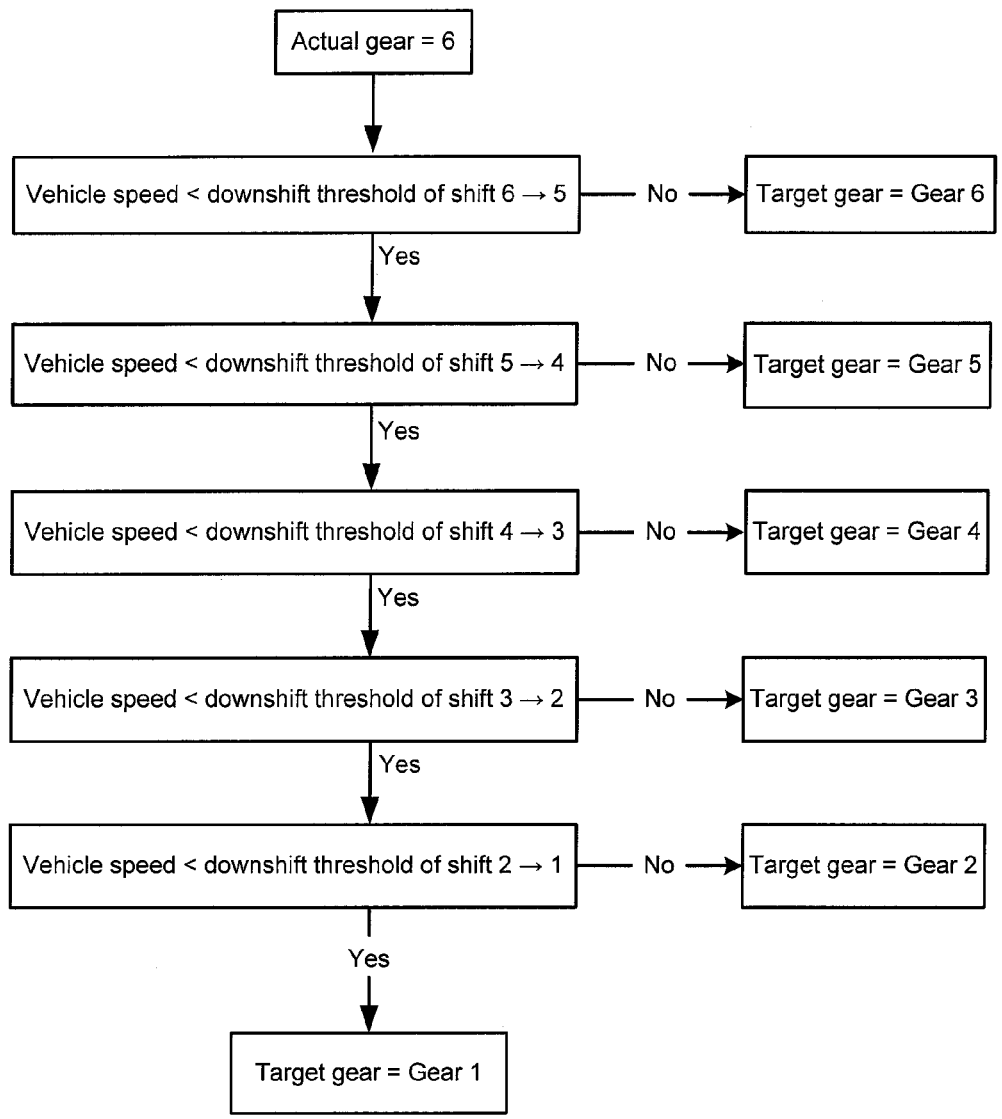
FIG. 1 is a flow chart illustrating a prior art shift strategy for a downshift of a twin clutch transmission.
Figure 2A:
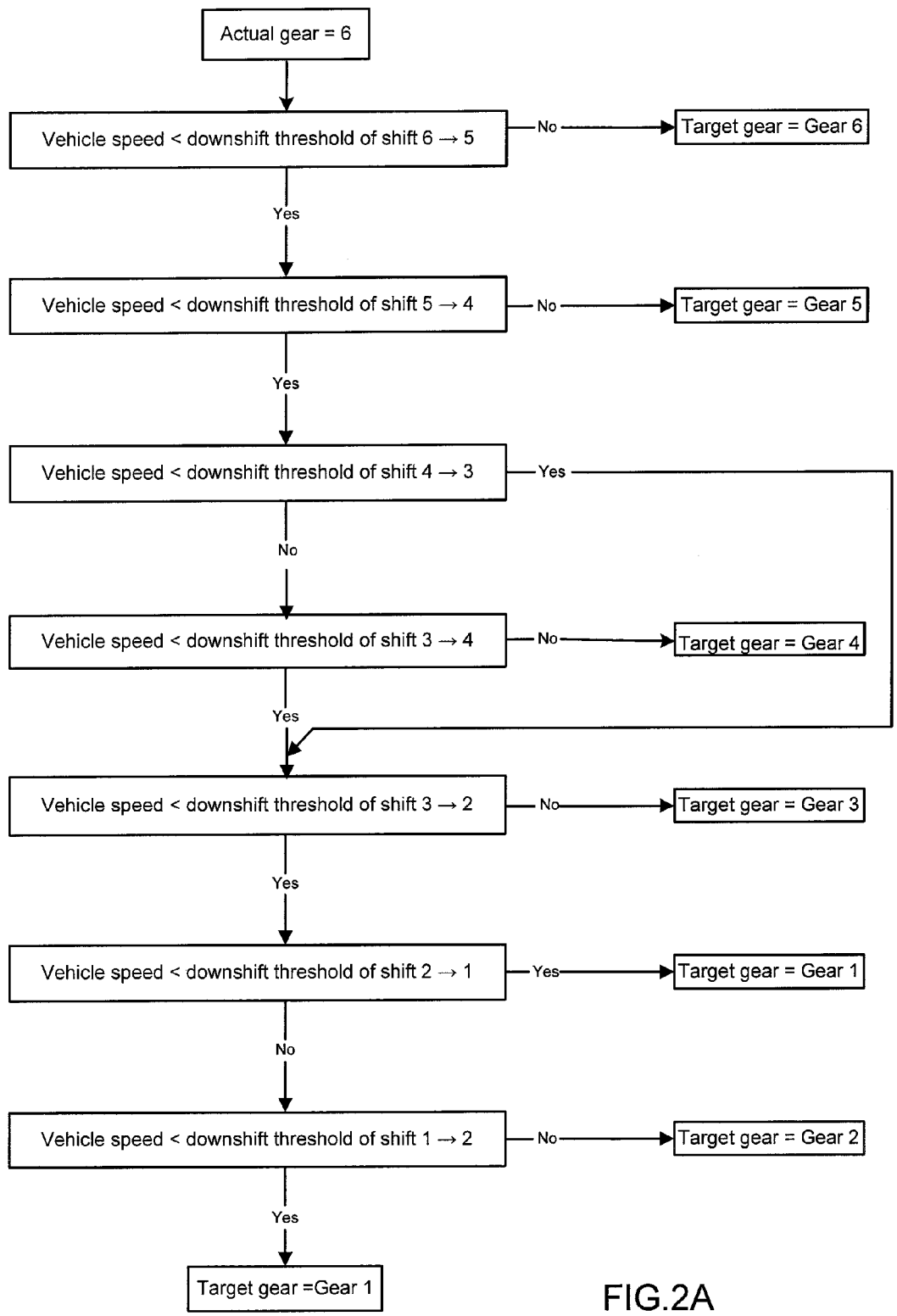
FIG. 2A is a flowchart of a shift strategy as per the method according to the invention.
Figure 2B:
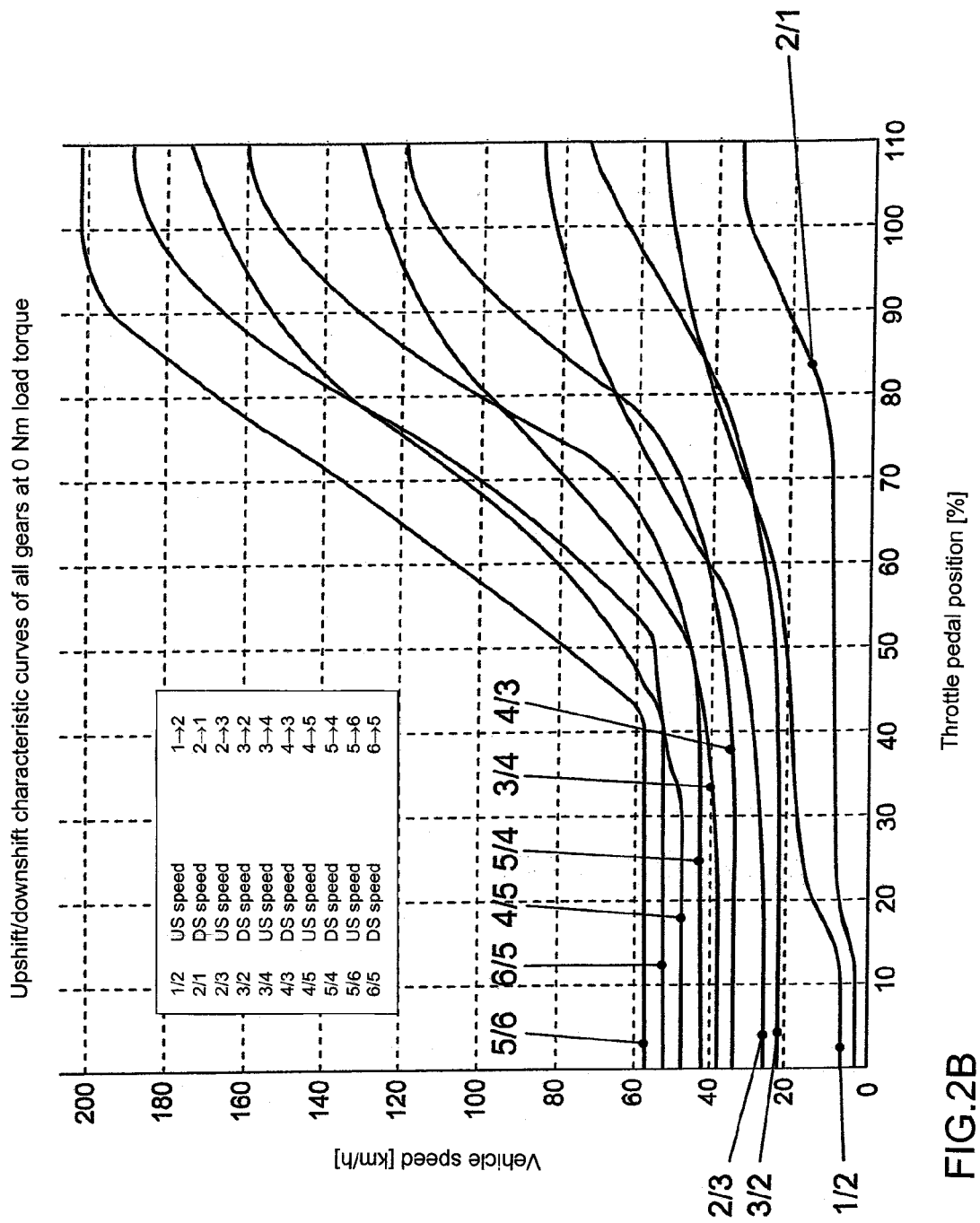
FIG. 2B is a schematic illustration clarifying the upshift and downshift thresholds, or the corresponding upshift and downshift characteristic curves, which are stored in the control unit.
Figure 3:
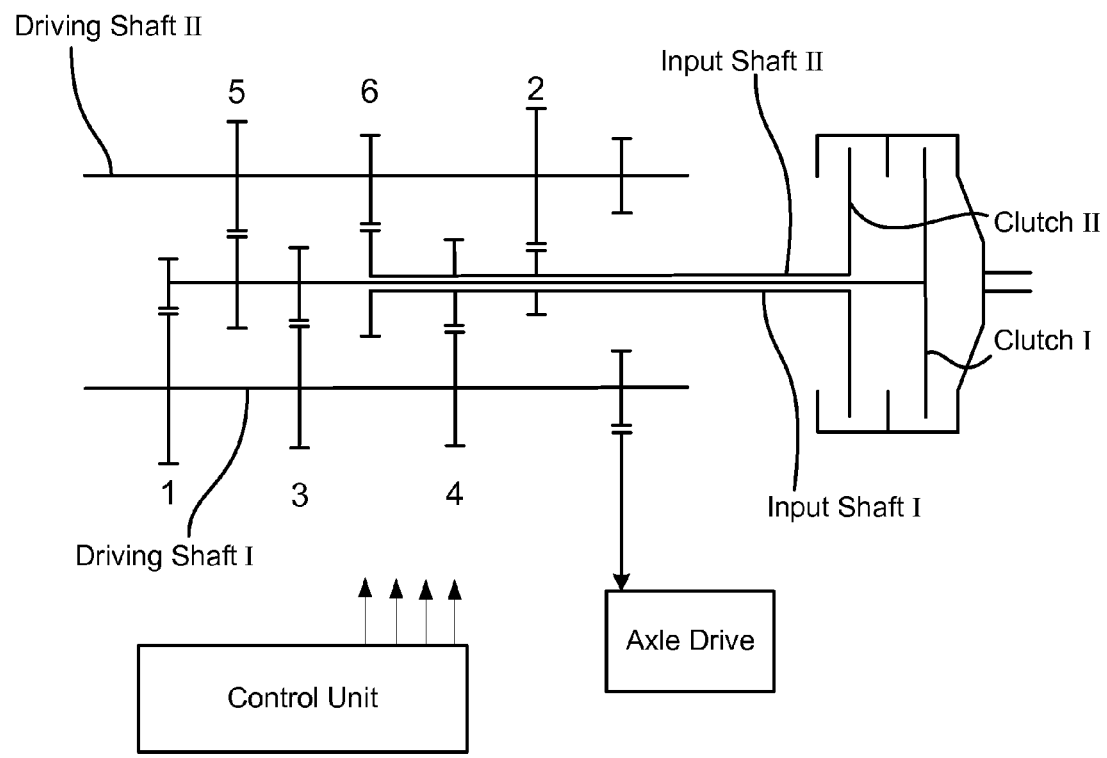
FIG. 3 is a diagram of a twin clutch transmission and a control unit.

FIG. 1 pertains to the prior art and is described in the introductory text above. FIGS. 2A and 2B pertain to the method according to the invention.

Before discussing FIG. 2A and the method according to the invention in more detail, certain expressions and/or terms are to be explained and/or defined once again on the basis of FIG. 2B.

In FIG. 2B, the throttle pedal or accelerator pedal position is plotted on the X-axis and the vehicle speed is plotted on the Y-axis. Also illustrated are corresponding upshift characteristic curves and downshift characteristic curves for the gears 1 to 6. Clearly illustrated are for example the upshift characteristic curve 1/2, the downshift characteristic curve 2/1, the downshift characteristic curve 4/3, the upshift characteristic curve 3/4 and also the other shift characteristic curves. It is very generally the case that a corresponding shift characteristic curve A/B is illustrated as an upshift curve where A<B and as a downshift curve where A>B. The individual upshift and downshift curves are illustrated here for the realization of the shifts from a source gear to a target gear for a twin clutch transmission.

The twin clutch transmission has a plurality of gears which are distributed on two transmission input shafts (two partial transmissions), in this case for example six forward gear stages, in particular six (6) gears. Sequentially directly successive gears are assigned for example to different transmission input shafts, with in each case one upshift and downshift threshold, which is defined as a function of the throttle pedal position, for each possible sequential gear change A/B being stored in the control unit. Here, the term "upshift threshold" or "downshift threshold" is to be understood to mean the limit value which applies to the respective shift and which is stored as a corresponding vehicle speed value in the control unit. In other words, for each individual throttle pedal position, corresponding vehicle speed values are stored for a certain upshift and for a certain downshift as a function of different upshift and downshift threshold values which are referred to in the following as limit values. Here, each downshift threshold and each upshift threshold is assigned in each case one lower and one higher gear of the respective sequential gear change A→B.

The values which are stored for example over a throttle pedal range from 0 to 100%, for example for the upshift from 1→2, yield the upshift characteristic curve 1/2. A similar situation applies to the downshift characteristic curve 2/1 and so on, that is to say a respective downshift characteristic curve A/B is formed from a plurality of downshift thresholds/values which are stored as limit values over the entire throttle pedal travel range for said specific downshift A/B. For example, the downshift characteristic curve 2/1 is formed from specific vehicle speed values over the throttle pedal travel range, so that the downshift characteristic curve 2/1 can be seen from FIG. 2B. A similar or corresponding situation applies to the other upshift and downshift characteristic curves A/B in FIG. 2B.

The shifts in a twin clutch transmission are optimized, or in particular indirect shifts in a twin clutch transmission are reduced, in that, in the case of a nominal downshift from a source gear to a lower gear, the target gear is determined in that the current vehicle speed is initially compared with the limit value of the closest downshift threshold, or of the adjacent downshift thresholds in said downshift direction, until the current vehicle speed is higher than the respective limit value of the most recently checked downshift threshold, in that, if, at the most recently checked downshift threshold, the higher gear of said downshift threshold is assigned the same transmission input shaft as the source gear, then the current vehicle speed is compared with the limit value of the upshift threshold which corresponds to the most recently checked downshift threshold, and in that, when the current vehicle speed is higher than said limit value of the upshift threshold, the higher gear of said upshift threshold is selected as a target gear, but if the current vehicle speed is lower than the limit value of the upshift threshold, the lower gear of said upshift threshold is selected as a target gear.

The fundamental principle of the invention as described above can be explained in detail on the basis of FIG. 2A:

FIG. 2A shows a nominal downshift from a source gear, specifically the sixth gear "Gear 6" into a lower gear, specifically into a target gear which is to be determined in the following. The target gear is determined in that the present traveling speed of the motor vehicle is initially compared with the limit value of the closest downshift threshold. In the case of FIG. 2B, this is the downshift threshold for the shift 6→5. If the check yields that the current vehicle speed is higher than the respective limit value of said downshift threshold, then the branch "No" is taken and the sixth gear "Gear 6" remains engaged in the twin clutch transmission. If the check yields that the current vehicle speed is higher than the downshift threshold of the shift 6→5, then the branch "Yes" is taken and the next check is carried out, specifically the current vehicle speed is compared only with the limit value of the closest subsequent—as viewed in the downshift direction—downshift threshold, in this case the downshift threshold of the shift 5→4. If said comparison yields that the current vehicle speed is higher than the corresponding limit value of the downshift threshold of the shift 5→4, then the branch "No" is taken and the fifth gear "Gear 5" is engaged. In the other case, the branch "Yes" is taken and the current vehicle speed is then compared with the limit value of the downshift threshold for the shift 4→3. Said comparison then takes place in the downshift direction for each subsequent downshift threshold until the current vehicle speed is higher than the respective limit value with the most recently compared downshift threshold.

Then—as is the case in FIG. 2A—the branch "No" is taken and, after the comparison of the current vehicle speed with the downshift threshold of the shift 4→3, the current vehicle speed is compared with the upshift threshold, which corresponds to said downshift threshold, of the shift 3→4. If the current vehicle speed is higher than said limit value of the upshift threshold, then the branch "No" is taken and the higher gear of said upshift threshold of the shift 3→4, that is to say the fourth gear, is selected as a target gear. In contrast, however, if the current vehicle speed is lower than the limit value of the upshift threshold 3→4, the lower gear of said upshift threshold 3→4, the branch "Yes" is taken, and is selected as a target gear, that is to say in this case, the third gear "Gear 3".

The basic principle of the invention therefore has the effect that, after the current vehicle speed has been compared with a respective limit value of a downshift threshold, the current vehicle speed is then once again compared with the upshift threshold B/A which corresponds to said downshift threshold A/B, specifically in order to then check as to whether it is expedient to select the lower or higher gear defined by the upshift threshold. In this way, indirect shifts within a twin clutch transmission are avoided. If specifically said additional comparison with the limit value of the respective corresponding upshift threshold is carried out in particular when, at the most recently checked downshift threshold, the higher gear of said downshift threshold is assigned to the same transmission input shaft as the original source gear. The basic principle shown here does of course also apply to other downshifts, that is to say not only to the downshift from the sixth into the third or fourth gear but also for example from the fifth into the second gear, with the additional comparison taking place with the limit value of the respective corresponding upshift threshold for example after checking the downshift threshold 3→2.

As can be seen from FIG. 2A, in the event of a further reduction in the current vehicle speed, the additional check can also additionally be carried out here with the upshift threshold of the shift 1→2, as illustrated, after the downshift threshold of the shift 2→1.

The above-described principle applies not only to the downshift of a twin clutch transmission but can also be implemented in the upshift process of the twin clutch transmission. It is then the case that, in the case of a nominal upshift from a source gear to a higher gear, the target gear is determined in that the current vehicle speed is initially compared with the limit value of the closest upshift threshold, or of the adjacent upshift thresholds in said upshift direction, until the current vehicle speed is lower than the respective limit value of the most recently checked upshift threshold, in that, if, at the most recently checked upshift threshold, the lower gear of said upshift threshold is assigned the same transmission input shaft as the source gear, then the current vehicle speed is compared with the limit value of the downshift threshold which corresponds to the most recently checked upshift threshold, and in that, when the current vehicle speed is lower than said limit value of the downshift threshold, the lower gear of said downshift threshold is selected as a target gear, but if the current vehicle speed is higher than the limit value of the downshift threshold, the higher gear of said downshift threshold is selected as a target gear. This additional comparison with the limit value of the respective downshift threshold is carried out for example when, in the case of the most recently checked upshift threshold, the lower gear of said upshift threshold is assigned to the same transmission input shaft as the source gear.

In order to carry out the method, for example a corresponding control unit is provided, to which are supplied in each case the present varying driving parameters of the motor vehicle in real-time via sensors and corresponding control lines. The control unit has for example a microprocessor and a memory unit, with the upshift and downshift characteristic curves or the upshift thresholds and downshift thresholds, that is to say the respective limit values, being stored as a function of the throttle pedal position, in particular limit values/vehicle speed values corresponding to each throttle pedal position for certain gear stage changes being stored, in the memory unit, as can be seen from and is explained with regard to FIG. 2B. The corresponding comparisons are then carried out in the processor unit of the control unit as per the above-described driving strategy, which comparisons can then, as an end result, lead to unnecessary shifts in a twin clutch transmission being avoided.

The invention claimed is:

1. A method for shifting from a source gear to a target gear in a twin clutch transmission of a motor vehicle,
   wherein the twin clutch transmission has a plurality of gears distributed between two transmission input shafts, with sequentially directly successive gears being assigned to different transmission input shafts, and wherein in each case one upshift and downshift threshold, with a limit value applicable for the respective upshift or downshift, defined as a function of a throttle pedal position, for each possible sequential gear change is stored in a control unit as a corresponding vehicle speed value;
   the method which comprises:
   measuring a variable vehicle speed and a variable throttle pedal position as the motor vehicle is traveling;
   in case of a nominal downshift from a source gear to a lower gear, determining a target gear by initially comparing a current vehicle speed with the limit value of a respectively closest downshift threshold, or of adjacent downshift thresholds in the downshift direction, until the current vehicle speed is higher than the respective limit value of a most recently checked downshift threshold;
   if, at a most recently checked downshift threshold, the higher gear of the downshift threshold is assigned the same transmission input shaft as the source gear, comparing the current vehicle speed with the limit value of an upshift threshold that corresponds with the most recently checked downshift threshold, and, when the current vehicle speed is higher than the limit value of the upshift threshold, selecting the higher gear of the upshift threshold as the target gear, but if the current vehicle speed is lower than the limit value of the upshift threshold, selecting the lower gear of the upshift threshold as the target gear.

2. The method according to claim 1, which comprises assigning a first gear, a third gear, and a fifth gear to a first transmission input shaft and assigning a second gear, a fourth gear, and a sixth gear to a second transmission input shaft.

3. The method according to claim 1, which comprises:
   in case of a nominal upshift from a source gear to a higher gear, determining the target gear by initially comparing a current vehicle speed with a limit value of a closest upshift threshold, or of adjacent upshift thresholds in the upshift direction, until the current vehicle speed is lower than the respective limit value of a most recently checked upshift threshold;
   if, at the most recently checked upshift threshold, a lower gear of the upshift threshold is assigned the same transmission input shaft as the source gear, comparing the current vehicle speed with the limit value of the downshift threshold that corresponds to the most recently checked upshift threshold; and when the current vehicle speed is lower than said the value of the downshift threshold, selecting the lower gear of the downshift threshold as a target gear, but if the current vehicle speed is higher than the limit value of the downshift threshold, selecting the higher gear of the downshift threshold as a target gear.

4. A method for shifting from a source gear to a target gear in a twin clutch transmission of a motor vehicle, wherein the twin clutch transmission has a plurality of gears distributed between two transmission input shafts, with sequentially directly successive gears being assigned to different transmission input shafts, and wherein in each case one upshift and downshift threshold, with a limit value applicable for the respective upshift or downshift, defined as a function of a throttle pedal position, for each possible sequential gear change is stored in a control unit as a corresponding vehicle speed value;

the method which comprises:

measuring a variable vehicle speed and a variable throttle pedal position as the motor vehicle is traveling;

in case of a nominal upshift from a source gear to a higher gear, determining the target gear by initially comparing a current vehicle speed with a limit value of a closest upshift threshold, or of adjacent upshift thresholds in the upshift direction, until the current vehicle speed is lower than the respective limit value of a most recently checked upshift threshold;

if, at the most recently checked upshift threshold, a lower gear of the upshift threshold is assigned the same transmission input shaft as the source gear, comparing the current vehicle speed with the limit value of the downshift threshold that corresponds to the most recently checked upshift threshold; and when the current vehicle speed is lower than said the value of the downshift threshold, selecting the lower gear of the downshift threshold as a target gear, but if the current vehicle speed is higher than the limit value of the downshift threshold, selecting the higher gear of the downshift threshold as a target gear.

5. The method according to claim 4, which comprises assigning a first gear, a third gear, and a fifth gear to a first transmission input shaft and assigning a second gear, a fourth gear, and a sixth gear to a second transmission input shaft.

* * * * *